A page from United States Patent US 6,737,465 B2.

(12) United States Patent
Seidel et al.

(10) Patent No.: US 6,737,465 B2
(45) Date of Patent: May 18, 2004

(54) FLAME-RESISTANT POLYCARBONATE MOLDING COMPOSITIONS CONTAINING HIGH-PURITY TALC

(75) Inventors: Andreas Seidel, Dormagen (DE); Thomas Eckel, Dormagen (DE); Michael Zobel, Köln (DE); Torsten Derr, Dormagen (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 102 days.

(21) Appl. No.: 10/168,422

(22) PCT Filed: Dec. 12, 2000

(86) PCT No.: PCT/EP00/12568
§ 371 (c)(1), (2), (4) Date: Jun. 21, 2002

(87) PCT Pub. No.: WO01/48074
PCT Pub. Date: Jul. 5, 2001

(65) Prior Publication Data
US 2003/0083419 A1 May 1, 2003

(30) Foreign Application Priority Data
Dec. 24, 1999 (DE) .......... 199 62 930

(51) Int. Cl.⁷ .......... C08K 3/34; C08K 5/523; C08K 5/5313; C08K 5/5399
(52) U.S. Cl. .......... 524/451; 524/116; 524/127; 524/148
(58) Field of Search .......... 524/116, 127, 524/148, 451

(56) References Cited

U.S. PATENT DOCUMENTS

| | | | | |
|---|---|---|---|---|
| 5,672,645 A | 9/1997 | Eckel et al. | .......... | 524/127 |
| 5,849,827 A | 12/1998 | Bödiger et al. | .......... | 521/423 |
| 5,961,915 A | 10/1999 | Toyouchi et al. | .......... | 264/572 |
| RE36,902 E | 10/2000 | Eckel et al. | .......... | 524/127 |
| 6,632,442 B1 * | 10/2003 | Chyall et al. | .......... | 424/400 |

FOREIGN PATENT DOCUMENTS

| | | |
|---|---|---|
| CA | 2300217 | 2/1999 |
| DE | 197 53 542 | 6/1999 |
| EP | 0 363 608 | 1/1994 |
| EP | 0 452 788 | 11/1995 |
| EP | 0 391 413 | 12/1996 |
| EP | 0 758 003 | 2/1997 |
| EP | 0 884 366 | 12/1998 |
| EP | 0 893 475 | 1/1999 |
| JP | 7-316411 | 5/1995 |

* cited by examiner

Primary Examiner—Peter Szekely
(74) Attorney, Agent, or Firm—Joseph C. Gil; Aron Preis

(57) ABSTRACT

A thermoplastic molding composition comprising polycarbonate, an impact modifier, a phosphorus-containing flameproofing agent, and high purity talc is disclosed. The composition offers flame resistance for molded parts having small wall thickness, improved rigidity and resistance to stress cracking. The talc has MgO content of 30.5 to 32 wt. %, $SiO_2$ content of 60 to 62.5 wt. % and $Al_2O_3$ content lower than 0.7 wt. % and $d_{50}$ value less than or equal to 2.5 μm.

22 Claims, No Drawings

FLAME-RESISTANT POLYCARBONATE MOLDING COMPOSITIONS CONTAINING HIGH-PURITY TALC

The present invention relates to polycarbonate compositions filled with talc which, in addition to excellent flame resistance, are distinguished even at small wall thicknesses by improved rigidity, good resistance to stress cracking, i.e. resistance to chemicals, and by low tool abrasion and low coating formation ("juicing") during processing.

Filled or reinforced PC/ABS moulding compositions are known.

EP-A 0 391 413 describes, for example, PC/ABS moulding compositions containing inorganic fillers having particular geometric properties, the moulding compositions being specified by a relatively low linear thermal expansion coefficient, high strength under impact loading, and a high dimensional stability under heat. Talc and uncalcined clay materials are described as fillers according to the invention. Flameproofing agents are mentioned only generally in a group of additives.

In EP-A 0 452 788 there are described talc-containing PC/ABS moulding compositions which are distinguished especially by a matt surface of the material. Here too, flameproofing agents are mentioned only generally.

Filled or reinforced PC/ABS moulding compositions which have been rendered flame-resistant are also already known.

JP-A 0 219 9162 describes reinforced, flame-resistant PC/ABS moulding compositions provided with a halogen-containing flameproofing agent having a halogen content of from 0.5 to 15 wt. %. Talc is mentioned generally as a possible filler.

EP-A 0 363 608 and EP-A 0 640 655 relate to PC/ABS moulding compositions which have been rendered flame-resistant by oligophosphoric acid esters or mixtures of oligo- and mono-phosphoric acid esters. It is mentioned in general that the moulding compositions may contain reinforcing materials. Examples of reinforced moulding compositions are not disclosed, however.

WO 99/07778 describes reinforced PC/ABS moulding compositions which have been rendered flame-resistant by organic phosphorus compounds, the polycarbonate content of those moulding compositions being a mixture of two aromatic polycarbonates having different solution viscosities. Only the use of glass fibres as reinforcing agent is demonstrated by means of examples. Those lead to undesirable tool abrasion during processing of the moulding composition. WO 99/07778 teaches that PC/ABS moulding compositions having a better modulus of elasticity, notched bar impact strength and processing properties are obtained when particular mixtures of polycarbonates of different viscosities are used.

In EP-A 0 754 531 it is mentioned that the use of fibrous fillers having a high L/D ratio leads to products having anisotropic properties (tensile strength, rigidity, linear thermal expansion coefficient, shrinkage ratio), which often has undesirable consequences such as warping, deformation on heating, etc. There is described a PC/ABS moulding composition which has been rendered flame-resistant by the use of particular oligophosphoric acid esters and reinforced by a filler having a lamellar structure. Examples containing glass flakes, micas and mixtures thereof as filler are disclosed in particular. Talc is not mentioned explicitly as a filler. EP-A 754 531 teaches that the described moulding compositions are distinguished by low deformation in the case of variations in temperature, allowing them to be used for high-precision components. Further advantages mentioned are a low tendency towards bleeding of the flameproofing agent and towards the formation of a coating in the injection-moulding tool.

JP-A 0 731 6411 describes PC/ABS moulding compositions which contain from 1 to 30% of an aromatic monophosphate as flameproofing agent and from 1 to 20% of a calcined talc having an average particle size of 2 µm or less as filler. The moulding compositions are distinguished by good processability, strength and dimensional stability under heat as well as by excellent flame protection. Experience teaches, however, that monophosphates tend to bleed and to form undesirable coatings on the tools during processing by injection moulding.

U.S. Pat. No. 5,849,827 and WO 99/07788 disclose flame-resistant thermoplastic moulding compositions, based on polycarbonate, which contain very finely divided inorganic powders. Talc is not mentioned. It is described that, by the addition of the finely divided inorganic powders, the after-burning times at 1.6 mm according to UL 94 V, and hence the flameproofing properties, are improved.

The object of the present invention is to improve the flame resistance (reduction of the after-burning times and dripping tendency in the UL 94 V test) in the case of thin wall thicknesses, especially of 1.5 mm and below, while at the same time increasing the rigidity of the material, which is especially important in the case of thin-walled mouldings. Furthermore, the moulding compositions are to have good resistance to stress cracking, good hydrolytic stability, a low warping tendency, good flowability, dimensional stability under heat and strength and, during processing, negligible tool abrasion and negligible coating formation as a result of bleeding of the flameproofing agent during processing.

It has now been found that impact-modified polycarbonate compositions which contain the particular talc described below have the desired properties. The profile of properties of the compositions according to the invention especially permits their use in the production of thin-walled mouldings, especially for applications which require reliable flame protection.

Accordingly, the present invention provides polycarbonate compositions containing impact modifier, at least one phosphorus-containing flameproofing agent, and
from 0.05 to 40 parts by weight, preferably from 0.5 to 30 parts by weight, particularly preferably from 1 to 20 parts by weight, based on the total composition, of a particular highly pure talc having an MgO content of from 28 to 35 wt. %, preferably from 30 to 33 wt. %, particularly preferably from 30.5 to 32 wt. %, and an $SiO_2$ content of from 55 to 65 wt. %, preferably from 58 to 64 wt. %, particularly preferably from 60 to 62.5 wt. %, in each case based on the talc.

Especially preferred types of talc are further distinguished by an $Al_2O_3$ content of less than 5 wt. %, especially less than 1 wt. %, more especially less than 0.7 wt. %, based on the talc.

Preference is given to polycarbonate compositions containing

A) from 40 to 98 parts by weight, preferably from 45 to 95 parts by weight, particularly preferably from 50 to 90 parts by weight, of at least one aromatic polycarbonate, B) from 0.5 to 50 parts by weight, preferably from 1 to 35 parts by weight, particularly preferably from 1.5 to 25 parts by weight, of at least one graft polymer, C) from 0.5 to 40 parts by weight, especially from 2 to 20 parts by weight, of at least one phosphorus-containing flameproofing agent, D) from 0.05 to 40 parts by weight, especially from 0.5 to 30 parts by weight, particularly preferably from 1 to 20 parts by weight, of a talc according to the above definition.

The sum of the parts by weight of all the components (A to D and, optionally, further constituents) is 100.

Very particularly preferred polycarbonate compositions are distinguished especially by the fact that, at wall thicknesses of less than or equal to 1.5 mm, preferably at wall thicknesses of 1.2 mm or less, they pass the UL 94V test with the rating V-0.

Component A

Aromatic polycarbonates and/or aromatic polyester carbonates according to component A which are suitable according to the invention are known in the literature or can be prepared by processes which are known in the literature (for the preparation of aromatic polycarbonates see, for example, Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610, DE-OS 3 832 396; for the preparation of aromatic polyester carbonates see, for example, DE-OS 3 077 934).

The preparation of aromatic polycarbonates is carried out, for example, by reacting diphenols with carbonic acid halides, preferably phosgene, and/or with aromatic dicarboxylic acid dihalides, preferably benzenedicarboxylic acid dihalides, by the interfacial process, optionally using chain terminators, for example monophenols, and optionally using branching agents having a functionality of three or more than three, for example triphenols or tetraphenols.

Diphenols for the preparation of aromatic polycarbonates and/or aromatic polyester carbonates are preferably those of formula (I)

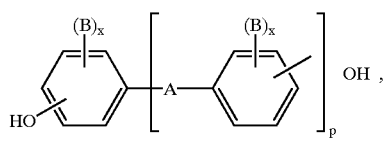

(I)

wherein
A represents a single bond, $C_1-C_5$-alkylene, $C_2-C_5$-alkylidene, $C_5-C_6$-cycloalkylidene, —O—, —SO—, —CO—, —S—, —SO$_2$—, $C_6-C_{12}$-arylene, to which there may be condensed other aromatic rings optionally containing hetero atoms,
or a radical of formula (II) or (III)

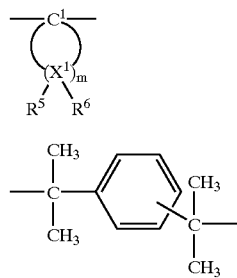

each of the substituents B represents $C_1-C_{12}$-alkyl, preferably methyl, halogen, preferably chlorine and/or bromine,
the substituents x are each independently of the other 0, 1 or 2,
p represents 1 or 0, and
$R^5$ and $R^6$ can be selected individually for each $X^1$ and are each independently of the other hydrogen or $C_1-C_6$-alkyl, preferably hydrogen, methyl or ethyl,
$X^1$ represents carbon, and
m represents an integer from 4 to 7, preferably 4 or 5, with the proviso that at at least one atom $X^1$, $R^5$ and $R^6$ are simultaneously alkyl.

Preferred diphenols are hydroquinone, resorcinol, dihydroxydiphenols, bis-(hydroxyphenyl)-$C_1-C_5$-alkanes, bis-(hydroxyphenyl)-$C_5-C_6$-cycloalkanes, bis-(hydroxyphenyl) ethers, bis-(hydroxyphenyl) sulfoxides, bis-(hydroxyphenyl) ketones, bis-(hydroxyphenyl)-sulfones and α,α-bis-(hydroxyphenyl)-diisopropylbenzenes and their derivatives brominated and/or chlorinated at the nucleus.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-di-hydroxydiphenyl-sulfone and their di- and tetra-brominated or -chlorinated derivatives, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxy-phenyl)-propane.

2,2-Bis-(4-hydroxyphenyl)-propane (bisphenol A) is particularly preferred.

The diphenols may be used individually or in the form of any desired mixtures.

The diphenols are known in the literature or obtainable by processes known in the literature.

Suitable chain terminators for the preparation of thermoplastic aromatic polycarbonates are, for example, phenol, p-chlorophenol, p-tert.-butylphenol or 2,4,6-tribromophenol, as well as long-chained alkylphenols, such as 4-(1,3-tetra-methylbutyl)-phenol according to DE-OS 2 842 005 or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol. The amount of chain terminators to be used is generally from 0.5 mol % to 10 mol %, based on the molar sum of the diphenols used in a particular case.

The thermoplastic aromatic polycarbonates have mean weight-average molecular weights ($M_w$, measured, for example, by means of an ultracentrifuge or by scattered-light measurement) of from 10,000 to 200,000, preferably from 15,000 to 80,000.

The thermoplastic aromatic polycarbonates may be branched in a known manner, preferably by the incorporation of from 0.05 to 2.0 mol %, based on the sum of the diphenols used, of compounds having a functionality of three or more than three, for example compounds having three or more phenolic groups.

Both homopolycarbonates and copolycarbonates are suitable. For the preparation of copolycarbonates according to component A according to the invention, from 1 to 25 wt. %, preferably from 2.5 to 25 wt. % (based on the total amount of diphenols to be used) of polydiorganosiloxanes having hydroxy-aryloxy terminal groups may also be used. Those compounds are known (see, for example, U.S. Pat. No. 3,419,634) or can be prepared by processes known in the literature. The preparation of copolycarbonates containing polydiorganosiloxanes is described, for example, in DE-OS 3 334 782.

In addition to the homopolycarbonates of bisphenol A, preferred polycarbonates are the copolycarbonates of bisphenol A containing up to 15 mol %, based on the molar sum of diphenols, of diphenols other than those mentioned as being preferred or particularly preferred, especially 2,2-bis-(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Special preference is given to mixtures of the diacid dichlorides of isophthalic acid and terephthalic acid in a ratio of from 1:20 to 20:1.

In the preparation of polyester carbonates, a carbonic acid halide, preferably phosgene, is additionally used concomitantly as bifunctional acid derivative.

In addition to the monophenols already mentioned, there come into consideration as chain terminators for the preparation of the aromatic polyester carbonates also the chlorocarbonic acid esters of the mentioned monophenols and the acid chlorides of aromatic monocarboxylic acids, which may optionally be substituted by $C_1$–$C_{22}$-alkyl groups or by halogen atoms, as well as aliphatic $C_2$–$C_{22}$-monocarboxylic acid chlorides.

The amount of chain terminators is in each case from 0.1 to 10 mol %, based in the case of phenolic chain terminators on moles of diphenols and in the case of monocarboxylic acid chloride chain terminators on moles of dicarboxylic acid dichlorides.

The aromatic polyester carbonates may also contain aromatic hydroxycarboxylic acids incorporated therein.

The aromatic polyester carbonates may be either linear or branched in a known manner (see in that connection also DE-OS 2 940 024 and DE-OS 3 007 934).

There may be used as branching agents, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-heptene, 2,4-dimethyl-2,4,6-tri-(4-hydroxyphenyl)-heptane, 1,3,5-tri-(4-hydroxyphenyl)-benzene, 1,1,1-tri-(4-hydroxyphenyl)ethane, tri-(4-hydroxyphenyl)-phenylmethane, 2,2-bis[4,4-bis(4-hydroxyphenyl)cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol %, based on diphenols used. Phenolic branching agents can be used initially with the diphenols, acid chloride branching agents can be introduced together with the acid dichlorides.

The content of carbonate structural units in the thermoplastic aromatic polyester carbonates can vary as desired. The carbonate group content is preferably up to 100 mol %, especially up to 80 mol %, particularly preferably up to 50 mol %, based on the sum of ester groups and carbonate groups. Both the esters and the carbonates contained in the aromatic polyester carbonates can be present in the polycondensation product in the form of blocks or in a randomly distributed manner.

The relative solution viscosity ($\eta_{rel}$) of the aromatic polycarbonates and polyester carbonates is in the range of from 1.18 to 1.4, preferably from 1.20 to 1.32 (measured on solutions of 0.5 g of polycarbonate or polyester carbonate in 100 ml of methylene chloride solution at 25° C.).

The thermoplastic aromatic polycarbonates and polyester carbonates may be used alone or in any desired mixture.

Component B

Component B contains one or more graft polymers of

B.1 from 5 to 95 wt. %, preferably from 30 to 90 wt. %, of at least one vinyl monomer with B.2 from 95 to 5 wt. %, preferably from 70 to 10 wt. %, of one or more graft bases having glass transition temperatures <10° C., preferably <0° C., particularly preferably <−20° C.

The graft base B.2 generally has a mean particle size ($d_{50}$ value) of from 0.05 to 10 μm, preferably from 0.1 to 5 μm, particularly preferably from 0.2 to 1 μm.

Monomers B.1 are preferably mixtures of

B.1.1 from 50 to 99 parts by weight of vinyl aromatic compounds and/or vinyl aromatic compounds substituted at the nucleus (such as, for example, styrene, α-methylstyrene, p-methylstyrene, p-chlorostyrene) and/or methacrylic acid ($C_1$–$C_8$)-alkyl esters (such as, for example, methyl methacrylate, ethyl methacrylate), and B.1.2 from 1 to 50 parts by weight of vinyl cyanides (unsaturated nitriles, such as acrylonitrile and methacrylonitrile) and/or (meth)acrylic acid ($C_1$–$C_8$)-alkyl esters (such as, for example, methyl methacrylate, n-butyl acrylate, tert.-butyl acrylate) and/or derivatives (such as anhydrides and imides) of unsaturated carboxylic acids (for example maleic anhydride and N-phenyl-maleimide).

Preferred monomers B.1.1 are selected from at least one of the monomers styrene, α-methylstyrene and methyl methacrylate; preferred monomers B.1.2 are selected from at least one of the monomers acrylonitrile, maleic anhydride and methyl methacrylate.

Particularly preferred monomers are B.1.1 styrene and B.1.2 acrylonitrile.

Suitable graft bases B.2 for the graft polymers B are, for example, diene rubbers, EP(D)M rubbers, that is to say those based on ethylene/propylene and optionally diene, acrylate, polyurethane, silicone, chloroprene and ethylene/vinyl acetate rubbers.

Preferred graft bases B.2 are diene rubbers (for example based on butadiene, isoprene, etc.) or mixtures of diene rubbers or copolymers of diene rubbers or mixtures thereof with other copolymerisable monomers (for example according to B.1.1 and B.1.2), with the proviso that the glass transition temperature of component B.2 is below <10° C., preferably <0° C., particularly preferably <−10° C.

Special preference is given to pure polybutadiene rubber.

Particularly preferred polymers B are, for example, ABS polymers (emulsion, mass and suspension ABS), as are described, for example, in DE-OS 2 035 390 (=U.S. Pat. No. 3,644,574) or in DE-OS 2 248 242 (=GB-PS 1 409 275) or in Ullmann, Enzyklopädie der Technischen Chemie, Vol. 19 (1980), p. 280 ff. The gel content of the graft base B.2 is at least 30 wt. %, preferably at least 40 wt. % (measured in toluene).

The graft copolymers B are prepared by free-radical polymerisation, for example by emulsion, suspension, solution or mass polymerisation, preferably by emulsion or mass polymerisation.

Particularly suitable graft rubbers are also ABS polymers which are prepared by redox initiation using an initiator system of organic hydroperoxide and ascorbic acid according to U.S. Pat. No. 4,937,285.

Since it is known that the graft monomers are not necessarily grafted on to the graft base completely in the graft reaction, graft polymers B are also to be understood according to the invention as being products that are obtained by (co)polymerisation of the graft monomers in the presence of the graft base and that are also obtained during working up.

Suitable acrylate rubbers according to B.2 for the polymers B are preferably polymers of acrylic acid alkyl esters, optionally with up to 40 wt. %, based on B.2, of other polymerisable, ethylenically unsaturated monomers. The preferred polymerisable acrylic acid esters include $C_1$–$C_8$-alkyl esters, for example methyl, ethyl, butyl, n-octyl and 2-ethylhexyl esters; haloalkyl esters, preferably halo-$C_1$–$C_8$-alkyl esters, such as chloroethyl acrylate, as well as mixtures of those monomers.

For crosslinking, monomers having more than one polymerisable double bond can be copolymerised. Preferred examples of crosslinking monomers are esters of unsaturated monocarboxylic acids having from 3 to 8 carbon atoms and of unsaturated monohydric alcohols having from 3 to 12 carbon atoms, or of saturated polyols having from 2 to 4 OH groups and from 2 to 20 carbon atoms, such as, for example, ethylene glycol dimethacrylate, allyl methacrylate; polyunsaturated heterocyclic compounds, such as, for example, trivinyl and triallyl cyanurate; polyfunctional vinyl compounds, such as di- and tri-vinylbenzenes; and also triallyl phosphate and diallyl phthalate.

Preferred crosslinking monomers are allyl methacrylate, ethylene glycol dimethacrylate, diallyl phthalate and heterocyclic compounds having at least three ethylenically unsaturated groups.

Particularly preferred crosslinking monomers are the cyclic monomers triallyl cyanurate, triallyl isocyanurate, triacryloylhexahydro-s-triazine, triallyl benzenes. The amount of crosslinking monomers is preferably from 0.02 to 5 wt. %, especially from 0.05 to 2 wt. %, based on the graft base B.2.

In the case of cyclic crosslinking monomers having at least three ethylenically unsaturated groups, it is advantageous to limit the amount to less than 1 wt. % of the graft base B.2.

Preferred "other" polymerisable, ethylenically unsaturated monomers which can optionally be used, in addition to the acrylic acid esters, for the preparation of the graft base B.2 are, for example, acrylonitrile, styrene, α-methylstyrene, acrylamides, vinyl $C_1$–$C_6$-alkyl ethers, methyl methacrylate, butadiene. Preferred acrylate rubbers as graft base B.2 are emulsion polymers having a gel content of at least 60 wt. %.

Other suitable graft bases according to B.2 are silicone rubbers having graft-active sites, as are described in DE-OS 3 704 657, DE-OS 3 704 655, DE-OS 3 631 540 and DE-OS 3 631 539.

The gel content of the graft base B.2 is determined at 25° C. in a suitable solvent (M. Hoffmann, H. Krömer, R. Kuhn, Polymeranalytik I und II, Georg Thieme-Verlag, Stuttgart 1977).

The mean particle size $d_{50}$ is the diameter above and below which in each case 50 wt. % of the particles lie. It can be determined by means of ultracentrifuge measurement (W. Scholtan, H. Lange, Kolloid, Z. und Z. Polymere 250 (1972), 782–1796).

Component C

Phosphorus-containing flameproofing agents within the scope of the invention are preferably selected from the groups of the monomeric and oligomeric phosphoric and phosphonic acid esters, phosphonate amines and phosphazenes, it being possible to use as flameproofing agents also mixtures of several components selected from one or various of those groups. Other phosphorus compounds not mentioned specifically here may also be used alone or in any desired combination with other phosphorus compounds.

Halogen-free phosphorus compounds are preferably used.

Preferred monomeric and oligomeric phosphoric and phosphonic acid esters are phosphorus compounds of the general formula (IV)

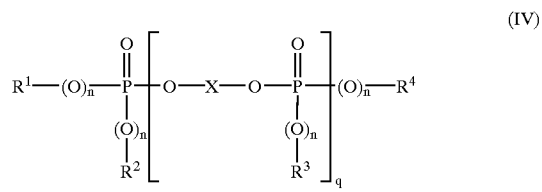

(IV)

wherein
$R^1$, $R^2$, $R^3$ and $R^4$ are each independently of the others optionally halogenated $C_1$- to $C_8$-alkyl, or $C_5$- to $C_6$-cycloalkyl, $C_6$- to $C_{20}$-aryl or $C_7$- to $C_{12}$-aralkyl each optionally substituted by alkyl, preferably $C_1$–$C_4$-alkyl, and/or by halogen, preferably chlorine, bromine,
the substituents n are each independently of the others 0 or 1,
q represents from 0 to 30, and
X represents a mono- or poly-nuclear aromatic radical having from 6 to 30 carbon atoms, or a linear or branched aliphatic radical having from 2 to 30 carbon atoms which may be OH-substituted and contain up to 8 ether bonds.

$R^1$, $R^2$, $R^3$ and $R^4$ are each independently of the others preferably $C_1$–$C_4$-alkyl, phenyl, naphthyl or phenyl-$C_1$–$C_4$-alkyl. The aromatic groups $R^1$, $R^2$, $R^3$ and $R^4$ may in turn be substituted by halogen and/or alkyl groups, preferably chlorine, bromine and/or $C_1$–$C_4$-alkyl. Particularly preferred aryl radicals are cresyl, phenyl, xylenyl, propylphenyl or butylphenyl and the corresponding brominated and chlorinated derivatives thereof.

X in formula (IV) preferably represents a mono- or poly-nuclear aromatic radical having from 6 to 30 carbon atoms. It is preferably derived from diphenols of formula (I).

Each of the substituents n in formula (IV), independently of the others, may be 0 or 1; n is preferably 1.

q represents values from 0 to 30. When mixtures of various components of formula (IV) are used, such mixtures may preferably have number-averaged q values from 0.3 to 20, particularly preferably from 0.5 to 10, especially from 0.5 to 6.

X is particularly preferably

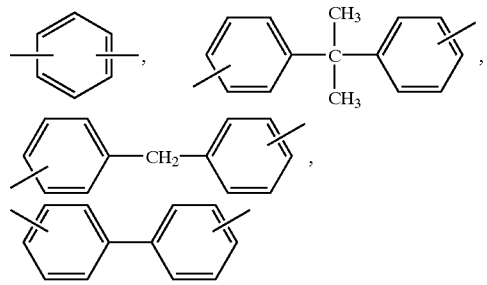

or their chlorinated or brominated derivatives; X is derived especially from resorcinol, hydroquinone, bisphenol A or 4,4'-dihydroxydiphenyl. X is particularly preferably derived from bisphenol A.

It has proved particularly advantageous to use oligomeric phosphoric acid esters of the general formula (IVa)

$$R^1-(O)_n-\overset{\overset{O}{\|}}{\underset{\underset{R^2}{(O)_n}}{P}}-\left[O-\underset{}{\overset{(R^5)_l}{\bigcirc}}-Y-\underset{}{\overset{(R^6)_l}{\bigcirc}}-O-\overset{\overset{O}{\|}}{\underset{\underset{R^3}{(O)_n}}{P}}\right]_q(O)_n-R^4, \quad (IVa)$$

in which $R^1$, $R^2$, $R^3$, $R^4$ and n are as defined above, the substituents 1 are each independently of the other 0, 1, 2, 3 or 4, preferably 0, 1 or 2, q is from 0.3 to 20, preferably from 0.5 to 10, especially from 0.5 to 6, $R^5$ and $R^6$ are each independently of the other $C_1$–$C_4$-alkyl, preferably methyl, and Y represents $C_1$–$C_7$-alkylidene, $C_1$–$C_7$-alkylene, $C_5$–$C_{12}$-cycloalkylene, $C_5$–$C_{12}$-cycloalkylidene, —O—, —S—, —SO—, $SO_2$ or —CO—, preferably $C_1$–$C_7$-alkylidene, especially isopropylidene or methyl.

Compositions provided with such phosphorus compounds exhibit a particularly high stress cracking resistance and hydrolytic stability and a particularly low tendency to form a coating during processing by injection moulding. Furthermore, an especially high dimensional stability under heat can be achieved with those flameproofing agents.

Particular preference is given to the use of those compounds of the general formula (IVa) that are derived from bisphenol A.

There may be used as component C according to the invention monophosphates (q=0), oligophosphates (q=from 1 to 30) or mixtures of mono- and oligo-phosphates.

Monophosphorus compounds of formula (IV) are especially tributyl phosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, halo-substituted aryl phosphates, methylphosphonic acid dimethyl esters, methylphosphonic acid diphenyl esters, phenylphosphonic acid diethyl esters, triphenylphosphine oxide or tricresylphosphine oxide.

The phosphorus compounds according to component C. formula (IV) are known (see, for example, EP-A 363 608, EP-A 640 655) or can be prepared in an analogous manner by known methods (for example Ullmanns Encyklopädie der technischen Chemie, Vol. 18, p. 301 ff 1979; Houben-Weyl, Methoden der organischen Chemie, Vol. 12/1, p. 43; Beilstein Vol. 6, p. 177).

The average q values can be determined by determining the composition of the phosphate mixture (molecular weight distribution) by means of a suitable method (gas chromatography (GC), high pressure liquid chromatography (HPLC), gel permeation chromatography (GPC)) and calculating the average values of q therefrom.

Phosphonate amines are preferably compounds of formula (V)

$$A_{3-y}-NB^1_y \qquad (V)$$

in which

A represents a radical of formula (Va)

$$\underset{R^{12}}{\overset{R^{11}}{\diagdown}}C\underset{CH_2-O}{\overset{CH_2-O}{\diagup}}\overset{O}{\underset{\|}{P}}-CH_2- \qquad (Va)$$

or (Vb)

$$\underset{R^{14}-O}{\overset{R^{13}-O}{\diagdown}}\overset{O}{\underset{\|}{P}}-CH_2- \qquad (Vb)$$

$R^{11}$ and $R^{12}$ are each independently of the other unsubstituted or substituted $C_1$–$C_{10}$-alkyl or unsubstituted or substituted $C_6$–$C_{10}$-aryl, $R^{13}$ and $R^{14}$ are each independently of the other unsubstituted or substituted $C_1$–$C_{10}$-alkyl or unsubstituted or substituted $C_6$–$C_{10}$-aryl, or $R^{13}$ and $R^{14}$ together represent unsubstituted or substituted $C_3$–$C_{10}$-alkylene, y represents the numerical values 0, 1 or 2, and the substituents $B^1$ are each independently hydrogen, optionally halogenated $C_2$–$C_8$-alkyl, unsubstituted or substituted $C_6$–$C_{10}$-aryl.

The substituents $B^1$ are preferably each independently hydrogen, et hyl, n- or isopropyl, which may be substituted by halogen; $C_6$–$C_{10}$-aryl, especially phenyl or naphthyl, which is unsubstituted or substituted by $C_1$–$C_4$-alkyl and/or by halogen.

Alkyl in $R^{11}$, $R^{12}$, $R^{13}$ and $R^{14}$, each independently of the others, is preferably methyl, ethyl, n-propyl, isopropyl, n-, iso-, sec.- or tert.-butyl, pentyl or hexyl.

Substituted alkyl in $R^{11}$, $R^{12}$, $R^{13}$ and $R^{14}$, each independently of the others, is preferably $C_1$–$C_{10}$-alkyl substituted by halogen, especially mono- or di-substituted methyl, ethyl, n-propyl, isopropyl, n-, iso-, sec.- or tert.-butyl, pentyl or hexyl.

$C_6$–$C_{10}$-Aryl in $R^{11}$, $R^{12}$, $R^{13}$ and $R^{14}$, each independently of the others, is preferably phenyl, naphthyl or binaphthyl, especially o-phenyl, o-naphthyl, o-binaphthyl, which may be substituted (generally mono-, di- or tri-substituted) by halogen.

$R^{13}$ and $R^{14}$ may form a ring structure together with the oxygen atoms to which they are directly bonded and the phosphorus atom.

The following are mentioned by way of preferred examples: 5,5,5',5',5",5"-hexamethyltris(1,3,2-dioxaphosphorinane-methane)amino-2,2',2"-trioxide of formula (Va-1)

$$\left[\underset{}{\diagup\!\!\!\diagdown}\underset{-O}{\overset{-O}{\diagup}}\overset{O}{\underset{\|}{P}}-CH_2-\right]_3 N \qquad (Va-1)$$

(test product XPM 1000, Solutia Inc., St. Louis, USA)

1,3,2-dioxaphosphorinane-2-methaneamine, N-butyl-N [(5,5-dimethyl-1,3,2-dioxaphosphorinan-2-yl)methyl]-5,5-dimethyl-, P,2-dioxides; 1,3,2-dioxaphosphorinane-2- methaneamine, N-[(5,5-dimethyl-1,3,2-dioxaphosphorinan-2-yl)methyl]-5,5-dimethyl-N-phenyl-, P,2-dioxide; 1,3,2-dioxaphosphorinane-2-methaneamine, N,N-dibutyl-5,5-dimethyl-, 2-oxide, 1,3,2-dioxaphosphorinane-2-methaneimine, N-[(5,5-dimethyl-1,3,2-dioxaphosphorinan-2-yl)methyl]-N-ethyl-5,5-dimethyl-, P,2-dioxide, 1,3,2-dioxaphosphorinane-2-methaneamine, N-butyl-N-[(5,5-dichloromethyl-1,3,2-dioxaphosphorinan-2-yl)-methyl]-5,5-di-chloromethyl-, P,2-dioxide, 1,3,2-dioxaphosphorinane-2-methaneamine, N-[(5,5-di-chloromethyl-1,3,2-dioxaphosphorinan-2-yl)methyl]-5,5-dichloromethyl-N-phenyl-, P,2-dioxide; 1,3,2-dioxaphosphorinane-2-methaneamine, N,N-di-(4-chlorobutyl)-5,5-dimethyl-2-oxides; 1,3,2-dioxaphosphorinane-2-methaneimine, N-[(5,5-dimethyl-1,3,2-dioxaphosphorinan-2-yl)-methane]-N-(2-chloroethyl)-5,5-di(chloromethyl)-, P,2-dioxide.

Also preferred are:

compounds of formula (Va-2) or (Va-3)

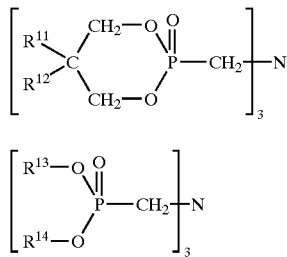

(Va-2)

(Va-3)

wherein $R^{11}$, $R^{12}$, $R^{13}$ and $R^{14}$ are as defined above.

Compounds of formulae (Va-2) and (Va-1) are particularly preferred.

The preparation of the phosphonate amines is described, for example, in U.S. Pat. No. 5,844,028.

Phosphazenes are compounds of formulae (VIa) and (VIb)

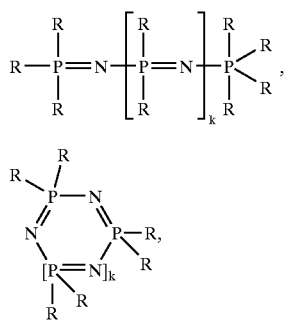

(VIa)

(VIb)

wherein the radicals R are each identical or different and represent amino, $C_1$–$C_8$-alkyl or $C_1$–$C_8$-alkoxy each optionally halogenated, preferably halogenated by fluorine, $C_5$- to $C_6$-cycloalkyl, $C_6$- to $C_{20}$-aryl, preferably phenyl or naphthyl, $C_6$- to $C_{20}$-aryloxy, preferably phenoxy, naphthyloxy, or $C_7$- to $C_{12}$-aralkyl, preferably phenyl-$C_1$–$C_4$-alkyl, each optionally substituted by alkyl, preferably $C_1$–$C_4$-alkyl, and/or by halogen, preferably chlorine and/or bromine, k represents 0 or a number from 1 to 15, preferably a number from 1 to 10.

The following may be mentioned by way of examples:
propoxyphosphazene, phenoxyphosphazene, methylphenoxyphosphazene, aminophosphazene and fluoroalkylphosphazenes.

Phenoxyphosphazene is preferred.

The phosphazenes may be used alone or in the form of a mixture with other phosphorus-containing flameproofing agents. The radical R may always be identical, or two or more radicals in formulae (VIa) and (VIb) may be different.

Phosphazenes and their preparation are described, for example, in EP-A 728 811, DE-A 1 961 668 and WO 97/40092.

The flameproofing agents may be used alone or in any desired mixture with one another or in admixture with other flameproofing agents.

Component D

Talc is understood as being a naturally occurring or a synthetically prepared talc.

Pure talc has the chemical composition 3 MgO.4SiO$_2$.H$_2$O and accordingly has an MgO content of 31.9 wt. %, an SiO$_2$ content of 63.4 wt. % and a content of chemically bonded water of 4.8 wt. %. It is a silicate having a layered structure.

Naturally occurring talc materials generally do not have the ideal composition mentioned above, since they are rendered impure by the partial replacement of the magnesium by other elements, by the partial replacement of silicon by, for example, aluminium, and/or by intergrowths with other minerals such as, for example, dolomite, magnesite and chlorite.

The particular types of talc within the scope of the invention are distinguished by an especially high purity, characterised by an MgO content of from 28 to 35 wt. %, preferably from 30 to 33 wt. %, particularly preferably from 30.5 to 32 wt. %, and an SiO$_2$ content of from 55 to 65 wt. %, preferably from 58 to 64 wt. %, particularly preferably from 60 to 62.5 wt. %. Preferred types of talc are further distinguished by an Al$_2$O$_3$ content of less than 5 wt. %, particularly preferably less than 1 wt. %, especially less than 0.7 wt. %.

Commercially available types of talc which correspond to that definition are, for example, Naintsch A3, A7, A10, A30 and Naintsch Prever M30 from Naintsch Mineralwerke GmbH (Graz, Austria), and the types Finntalc MO5SL, MO3 and M20SL which are marketed by Omya GmbH (Cologne).

Types of talc which are not within the scope of the invention are, for example, Naintsch SE-Standard, Naintsch SE-Super, Naintsch SE-Micro and Naintsch ST 10, 15, 20, 30 and 60, all of which are marketed by Naintsch Mineralwerke GmbH.

The use of the talc according to the invention in the form of finely ground types having a mean largest particle size d$_{50}$ of <20 μm, preferably <10 μm, particularly preferably <5 μm, very particularly preferably <2.5 μm, is especially advantageous. By using such fine types of talc, an improved (notched bar) impact strength in particular is achieved, without the remaining properties (flame resistance, rigidity, flow properties, resistance to stress cracking, etc.) being impaired thereby.

The talc can be surface-treated, for example silanised, in order to ensure better compatibility with the polymer. With regard to the processing and preparation of the moulding compositions, the use of compacted talc is also advantageous.

Further Additives E

The compositions according to the invention may contain as anti-dripping agents preferably fluorinated polyolefins E.1 in an amount of up to 3 parts by weight, preferably from 0.01 to 1 part by weight, based on the total composition.

Fluorinated polyolefins are generally known (see, for example, EP-A 640 655). A commercially available product is, for example, Teflon® 30 N from DuPont.

The fluorinated polyolefins may also be used in the form of a coagulated mixture of emulsions of the fluorinated polyolefins with emulsions of the graft polymers B) or with an emulsion of a copolymer preferably based on styrene/acrylonitrile, the fluorinated polyolefin in the form of an emulsion being mixed with an emulsion of the graft polymer or copolymer and subsequently coagulated.

The fluorinated polyolefins may also be used in the form of a pre-compound with the graft polymer B or with a copolymer preferably based on styrene/acrylonitrile. The fluorinated polyolefins are mixed in the form of a powder with a powder or granulate of the graft polymer or copolymer and are compounded in the melt generally at temperatures of from 208 to 330° C. in conventional apparatuses such as internal kneaders, extruders or double-shaft screws.

The fluorinated polyolefins may also be used in the form of a masterbatch, which is prepared by emulsion polymerisation of at least one monoethylenically unsaturated monomer in the presence of an aqueous dispersion of the fluorinated polyolefin. Preferred monomer components are styrene, acrylonitrile and mixtures thereof. The polymer is used in the form of a pourable powder after acid precipitation and subsequent drying.

The coagulates, pre-compounds and masterbatches usually have solids contents of fluorinated polyolefin of from 5 to 95 wt. %, preferably from 7 to 60 wt. %.

The compositions according to the invention may also contain further polymers.

There are suitable preferably vinyl (co)polymers (E.2) of at least one monomer from the group of the vinyl aromatic compounds, vinyl cyanides (unsaturated nitrites), (meth) acrylic acid ($C_1$–$C_8$)-alkyl esters, unsaturated carboxylic acids and derivatives (such as anhydrides and imides) of unsaturated carboxylic acids. There are suitable especially (co)polymers of E.2.1 from 50 to 99 parts by weight, preferably from 60 to 90 parts by weight, of vinyl aromatic compounds and/or vinyl aromatic compounds substituted at the nucleus, such as, for example, styrene, α-methylstyrene, p-methylstyrene, p-chlorostyrene, and/or methacrylic acid ($C_1$–$C_8$)-alkyl esters, such as, for example, methyl methacrylate, ethyl methacrylate, and E.2.2 from 1 to 50 parts by weight, preferably from 10 to 40 parts by weight, of vinyl cyanides (unsaturated nitriles), such as acrylonitrile and methacrylonitrile, and/or (meth)acrylic acid ($C_1$–$C_8$)-alkyl esters (such as, for example, methyl methacrylate, n-butyl acrylate, tert.-butyl acrylate) and/or unsaturated carboxylic acids (such as maleic acid) and/or derivatives (such as anhydrides and imides) of unsaturated carboxylic acids (for example maleic anhydride and N-phenyl-maleimide).

The (co)polymers E.2 are resin-like, thermoplastic and rubber-free.

Particular preference is given to the copolymer of E.2.1 styrene and E.2.2 acrylonitrile.

The (co)polymers according to E.2 are known and can be prepared by free-radical polymerisation, especially by emulsion, suspension, solution or mass polymerisation. The (co)polymers according to component E.2 preferably have molecular weights $M_w$ (weight average, determined by light scattering or sedimentation) of from 15,000 to 200,000.

Also suitable are polyalkylene terephthalates (E.3) such as are described in EP-A-841 187.

Preference is given to polyalkylene terephthalates which have been prepared from terephthalic acid and/or reactive derivatives thereof (e.g. dialkyl esters thereof) and ethylene glycol and/or 1,4-butanediol, and mixtures of those polyalkylene terephthalates.

The compositions according to the invention preferably contain vinyl (co)polymers, polyalkylene terephthalates or mixtures thereof up to an amount of 30 wt. %, preferably up to 15 wt. %, based on the total composition.

The moulding compositions according to the invention may contain at least one other of the conventional additives, such as, for example, anti-dripping agents, lubricants and mould-release agents, nucleating agents, antistatics, stabilisers, colourings and pigments, as well as fillers and reinforcing agents other than talc.

The moulding compositions according to the invention containing the above-mentioned components and, optionally, additives are prepared by mixing the respective constituents in a known manner and melt-compounding or melt-extruding them at temperatures of from 200° C. to 300° C. in conventional apparatuses such as internal kneaders, extruders and double-shaft screws.

The individual constituents may be mixed in a known manner either in succession or simultaneously, either at approximately 20° C. (room temperature) or at a higher temperature.

Owing to their excellent flame resistance and their good other properties, such as, for example, ESC behaviour (resistance to stress cracking), rigidity, dimensional stability under heat, flowability and lack of warping, the thermoplastic moulding compositions according to the invention are suitable for the production of moulded bodies of any kind, especially of thin-walled parts having increased requirements as regards flame resistance.

The moulded bodies can be produced, for example, by injection moulding or extrusion. Examples of moulded bodies which can be produced are: casing parts of any kind, for example for domestic appliances, such as juice extractors, coffee machines, mixers; for office equipment, such as monitors, (portable) computers, printers and copiers. Other possible fields of application are covering plates and electrical installation channels for the construction sector as well as parts for the motor vehicle sector. The moulding compositions can also be used in the field of electrical engineering, for example for switches, sockets and circuit boards.

The invention relates also to a process for the preparation of the composition, to the use of the composition in the production of moulded bodies, and to the moulded bodies themselves.

EXAMPLES

Component A-1

Polycarbonate based on bisphenol A having a relative solution viscosity of 1.28, measured in methylene chloride at 25° C. and in a concentration of 0.5 g/100 ml.

Component A-2

As component A-1, but having a relative solution viscosity of 1.20.

Component A-3

As component A-1, but having a relative solution viscosity of 1.25.

Component B-1

Graft polymer, prepared by emulsion polymerisation, of 45 parts by weight of styrene and acrylonitrile in a ratio of 72:28 with 55 parts by weight of a particulate crosslinked polybutadiene rubber (mean particle diameter $d_{50}$=from 0.3 to 0.4 μm).

Component B-2

Graft polymer of 83 parts by weight of a copolymer of styrene and acrylonitrile in a ratio of 75.5 with 24.5 parts by weight of crosslinked polybutadiene-styrene rubber having a styrene content of 10%, prepared by mass polymerisation (mean particle diameter $d_{50}=0.5$ μm).

Component C

C.1 Bisphenol-A-based phosphate

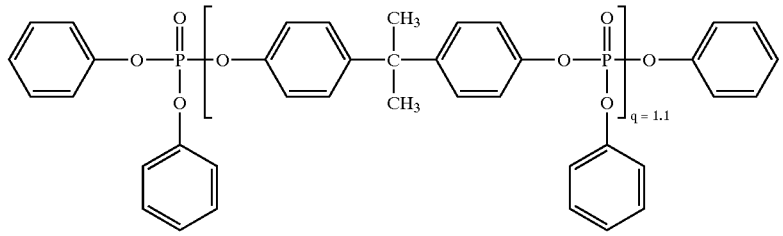

C.2 Resorcinol-based phosphate

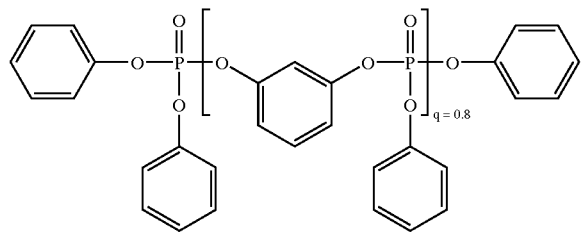

In order to determine the average q value, the proportions of the oligomeric phosphates were first determined by HPLC measurements:

| column type: | LiChrosorp RP-8 |
| --- | --- |
| eluant in the gradient: | acetonitrile/water 50:50 to 100:0 |
| concentration: | 5 mg/ml |

The number-weighted average values were then determined from the proportions of the individual components (mono- and oligo-phosphates) by known processes.

Component D

D1: Naintsch Prever M30, talc from Naintsch Mineralwerke GmbH (Graz, Austria) having an MgO content of 31.2 wt. %, an $SiO_2$ content of 62.5 wt. % and an $Al_2O_3$ content of 0.7 wt. %.

D2: Finntalc M05SL, talc from Mondo Minerals Oy (Helsinki, Finland), marketed by Omya GmbH (Cologne), having an MgO content of 31 wt. %, an $SiO_2$ content of 61 wt. % and an $Al_2O_3$ content of 0.3 wt. %.

D3: Finntalc M20SL, talc from Mondo Minerals Oy having an MgO content of 31 wt. %, an $SiO_2$ content of 61 wt. % and an $Al_2O_3$ content of 0.3 wt. %.

D4: Naintsch A3, talc from Naintsch Mineralwerke GmbH having an MgO content of 31.5 wt. %, an $SiO_2$ content of 62.0 wt. % and an $Al_2O_3$ content of 0.4 wt. %.

D5: Naintsch SE-Super, talc from Naintsch Mineralwerke GmbH having an MgO content of 22 wt. % and an $SiO_2$ content of 17 wt. %. $Al_2O_3$ was not detected.

D6: Naintsch ST10, talc from Naintsch Mineralwerke GmbH having an MgO content of 30 wt. %, an $SiO_2$ content of 48 wt. % and an $Al_2O_3$ content of 10.5 wt. %.

The data given with regard to the indicated chemical compositions are manufacturers' data. Analysis is carried out by methods known in the literature (for example by X-ray fluorescence spectroscopy or atom adsorption spectroscopy or calorimetry).

Component E-1

The polytetrafluoroethylene emulsion is prepared by co-precipitation of a mixture of aqueous emulsions of the graft polymer (component B) and of a tetrafluoroethylene polymer. The ratio by weight of graft polymer B to the tetrafluoroethylene polymer E in the coagulate is 90 wt. % to 10 wt. %. The tetrafluoroethylene polymer emulsion has a solids content of 60 wt. %, the mean PTFE particle diameter is from 0.05 to 0.5 μm. The graft polymer emulsion has a solids content of 34 wt. % and a mean latex particle diameter of from 0.3 to 0.4 μm.

Preparation of E-1

The emulsion of the tetrafluoroethylene polymer (Teflon 30 N from DuPont) is mixed with the emulsion of the graft polymer B and stabilised with 1.8 wt. %, based on polymer solid, of phenolic antioxidants. At from 85 to 95° C., the mixture is coagulated with an aqueous solution of $MgSO_4$ (Epsom salts) and acetic acid at pH from 4 to 5, filtered and washed until virtually free of electrolyte, and is subsequently freed of the majority of the water by centrifugation and then dried to a powder at 100° C. The powder can then be compounded with the other components in the described apparatuses.

Component E-2

Blendex 449: PTFE preparation from General Electric Plastics, consisting of 50 wt. % PTFE and 50 wt. % SAN copolymer.

Component E-3

Styrene/acrylonitrile copolymer having a styrene/acrylonitrile ratio of 72:28 and an intrinsic viscosity of 0.55 dl/g (measured in dimethylformamide at 20° C.).

Component E-4

Phosphite stabiliser

Component E-5

Pentaerythritol tetrastearate as mould-release agent.

Preparation and Testing of the Moulding Compositions According to the Invention

Components A to E are mixed in a 3 liter kneader. The moulded bodies are produced on an Arburg 270E injection-moulding machine at 240° C.

The stress cracking behaviour is tested on rods measuring 80×10×4 mm. The test medium used is a mixture of 60 vol. % toluene and 40 vol. % isopropanol. The test specimens are pre-expanded by means of a circular arc template (pre-extension from 1.2 to 2.4%) and stored in the test medium at room temperature for 5 minutes.

The stress cracking behaviour is assessed by means of the flexural elongation which at least is necessary for the rod to break within the 5-minute exposure time in the test medium.

The flame resistance is determined according to UL94V on rods having a thickness of 1.2 mm.

The tensile modulus is measured according to ISO 527/DIN 53 457.

TABLE 1

Composition and properties

| Example/Components | | 1 | 2 | 3 | 4 | 5 | C1* | C2* |
|---|---|---|---|---|---|---|---|---|
| A1 | | 32.3 | 32.3 | 32.3 | 32.3 | 32.3 | 32.3 | 32.3 |
| A2 | | 32.3 | 32.3 | 32.3 | 32.3 | 32.3 | 32.3 | 32.3 |
| A3 | | | | | | | | |
| B1 | | 8.6 | 8.6 | 5.0 | 5.0 | 5.0 | 5.0 | 5.0 |
| C1 | | | | | | | | |
| C2 | | 10.9 | 10.9 | 10.9 | 10.9 | 10.9 | 10.9 | 10.9 |
| D1 | | 10.0 | | | | | | |
| D2 | | | 10.0 | 10.0 | | | | |
| D3 | | | | | 10.0 | | | |
| D4 | | | | | | 10.0 | | |
| D5 | | | | | | | 10.0 | |
| D6 | | | | | | | | 10.0 |
| E1 | | | | 4.0 | 4.0 | 4.0 | 4.0 | 4.0 |
| E2 | | 0.8 | 0.8 | | | | | |
| E3 | | 4.6 | 4.6 | 5.0 | 5.0 | 5.0 | 5.0 | 5.0 |
| E4 | | 0.1 | 0.1 | 0.1 | 0.1 | 0.1 | 0.1 | 0.1 |
| E5 | | 0.4 | 0.4 | 0.4 | 0.4 | 0.4 | 0.4 | 0.4 |
| Properties: | | | | | | | | |
| Modulus of elasticity | [GPa] | 4.0 | 4.0 | 4.0 | 3.9 | 4.0 | 3.1 | 3.5 |
| ESC | Flexural elongation at break [%] | 2.4 | 2.2 | 2.2 | >2.4 | 2.0 | 2.0 | 2.4 |
| UL94V at 1.2 mm | Rating (Total after-burning time) | V0 (19 s) | V0 (11 s) | V0 (35 s) | V0 (8 s) | V0 (13 s) | V2 (81 s) | V1 (61 s) |

*Comparison test

| Example/Components | | 6 | 7 | 8 | 9 | 10 | 11 | 12 | C3* | 13 | C4* | 14 | 15 |
|---|---|---|---|---|---|---|---|---|---|---|---|---|---|
| A1 | | 34.8 | 35.8 | 36.8 | 27.3 | 31.6 | 26.7 | | | 32.8 | 33.1 | 31.3 | 30.3 |
| A2 | | 34.8 | 35.8 | 36.8 | 27.3 | 31.6 | 26.7 | | | 32.8 | 33.1 | 31.3 | 30.3 |
| A3 | | | | | | | | 64.9 | 67.0 | | | | |
| B1 | | 5.0 | 5.0 | 5.0 | 8.6 | 4.9 | 4.9 | 6.5 | 6.7 | 7.1 | 7.2 | | 2.0 |
| B2 | | | | | | | | | | | | 19.9 | 19.9 |
| C1 | | | | | | | | 12.8 | 12.8 | 14.0 | 14.4 | 15.1 | 15.3 | 14.0 | 14.0 |
| C2 | | 10.9 | 10.9 | 10.9 | 10.9 | | | | | | | | |
| D1 | | | | | | | | | | | | | |
| D2 | | 5.0 | 3.0 | 1.0 | 20.0 | 9.8 | 19.6 | 3.0 | | 1.0 | | | |
| D3 | | | | | | | | | | | | | |
| D4 | | | | | | | | | | | | 2.0 | 2.0 |
| D5 | | | | | | | | | | | | | |
| D6 | | | | | | | | | | | | | |
| E1 | | 4.0 | 4.0 | 4.0 | | 3.9 | 3.9 | 4.6 | 4.7 | 4.6 | 4.7 | | |
| E2 | | | | | 0.8 | | | | | | | 1.0 | 1.0 |
| E3 | | 5.0 | 5.0 | 5.0 | 4.6 | 4.9 | 4.9 | 6.5 | 6.7 | 6.1 | 6.1 | | |
| E4 | | 0.1 | 0.1 | 0.1 | 0.1 | 0.1 | 0.1 | 0.1 | 0.1 | 0.1 | 0.1 | 0.1 | 0.1 |
| E5 | | 0.4 | 0.4 | 0.4 | 0.4 | 0.4 | 0.4 | 0.4 | 0.4 | 0.4 | 0.4 | 0.4 | 0.4 |
| Properties: | | | | | | | | | | | | | |
| Modulus of elasticity | [GPa] | 3.4 | 3.1 | 2.8 | 5.5 | 3.9 | 5.4 | 2.9 | 2.6 | 2.8 | 2.5 | n.b. | n.b. |
| ESC | Flexural elongation at break [%] | 2.2 | 2.2 | 1.8 | 2.4 | 2.4 | 1.8 | >2.4 | 2.2 | 2.4 | 2.0 | 2.2 | 2.2 |
| UL94V at 1.2 mm | Rating (Total after-burning time) | V0 (19 s) | V0 (27 s) | V0 (43 s) | V0 (36 s) | V0 (27 s) | V0 (30 s) | V0 (23 s) | V2 (56 s) | V0 (42 s) | V2 (68 s) | V0 (17 s) | V0 (44 s) | n.b. = not broken

It will be seen from Table 1 that by using highly pure types of talc (Examples 1 to 5), improved flame resistance at a wall thickness of 1.2 mm (reduced after-burning times as well as a reduced dripping tendency) and a higher modulus of elasticity are achieved than when other types of talc are used in the same concentration (Comparisons 1 and 2). Only with highly pure talc is a V-0 rating achieved in the UL94V test at a wall thickness of 1.2 mm. The moulding compositions are further distinguished by an unusually good resistance to stress cracking. The nature of the PTFE preparation used has only a negligible effect on those properties (Examples 2 and 3). The effect is found with various phosphorus-containing flameproofing agents.

As the concentration of talc increases, the after-burning times are initially increasingly reduced within certain limits, which depend on the composition in question and on the nature of the flameproofing agent (Examples 3 and 6 to 8). The modulus of elasticity rises linearly with the talc content, an increase in the modulus of elasticity of up to 0.15 GPa per 1 wt. % of added talc being achieved in the case of highly pure types of talc, whereas markedly smaller increases in the modulus of elasticity are observed when other types of talc are used (Comparisons 1 and 2).

Even with very low talc contents of, for example, 1 wt. % it is possible, in combination with different phosphorus-containing flameproofing agents, to achieve a V-0 rating in the UL94V test at a wall thickness of 1.2 mm, and a marked improvement in the ESC behaviour (Examples 7, 8, 12 and 13). Comparison of Example 12 with Comparison 3 or Example 13 with Comparison 4 shows the positive effect of the talc on the flame resistance (after-burning time and dripping tendency) and on the resistance to stress cracking and the rigidity of the moulding composition. By using low concentrations of talc, for example from 1 to 5 wt. %, it is possible to prepare moulding compositions which have excellent flame resistance and a balance between increased rigidity and high strength, as well as very good ESC behaviour.

A V-0 rating in the UL94V test at a wall thickness of 1.2 mm is obtained, in combination with various phosphorus-containing flameproofing agents, also in the case of high talc contents of, for example, from 10 to 20 wt. % (for example, Examples 9 and 11). Those moulding compositions having a high talc content are distinguished by their excellent flame resistance and especially high rigidity, while at the same time being surprisingly high in strength.

If C.1 (bisphenol-A-based phosphate) is used as the phosphorus-containing flameproofing agent, an especially good ESC behaviour is obtained as compared with the resorcinol-based phosphate (C.2) especially in the case of low talc contents of, for example, less than or equal to 3 wt. % (Examples 7 and 8 and 12 and 13). However, even in the case of the resorcinol-based phosphate (C.2), an improvement in the ESC behaviour is achieved by the addition of talc (Examples 7 and 8).

The described positive effect of the particular talc on the flame resistance is observed both when only one polycarbonate is used and when a mixture of several polycarbonates of different solution viscosities is used (Examples 7, 8, 12 and 13).

The effect is observed also when mass ABS (Example 14) or mixtures of mass and emulsion ABS (Example 15) are used as impact modifier.

What is claimed is:

1. A thermoplastic molding composition comprising polycarbonate, an impact modifier, a phosphorus-containing flameproofing agent, and high purity talc, the talc having MgO content of 30.5 to 32 wt. %, $SiO_2$ content of 60 to 62.5 wt. % and $Al_2O_3$ content lower than 0.7 wt. %, the wt. %, all occurrences being relative to the weight of the talc, and the talc having $d_{50}$ less than or equal to 2.5 μm.

2. The composition of claim 1 wherein polycarbonate is present in an amount of 40 to 98%, the impact modifier is present in an amount of 0.5 to 50%, the phosphorus-containing flameproofing agent is present in an amount of 0.5 to 40%, and the talc is present in an amount of 0.05 to 40%, the percents being relative to the weight of the composition.

3. The composition of claim 1 wherein polycarbonate is present in an amount of 45 to 95%, the impact modifier is present in an amount of 1 to 35%, the phosphorus-containing flameproofing agent is present in an amount of 2 to 20%, and the talc is present in an amount of 0.5 to 30%, the percents being relative to the weight of the composition.

4. The composition of claim 1 wherein impact modifier is a graft polymer of 5 to 95% of at least one vinyl monomer grafted to 95 to 5% of a graft base having a glass transition temperature < 10° C.

5. The composition of claim 4 wherein graft base is a rubber selected from the group consisting of diene, ethylene-propylene-diene monomer (EPDM), acrylate and silicone.

6. The composition of claim 1 wherein impact modifier is at least one member selected from the group consisting of emulsion polymerized acrylonitrile-butadiene-styrene (ABS) and mass polymerized ABS.

7. The composition of claim 1 wherein phosphorus-containing flameproofing agent is selected from the group consisting of monophosphoric acid ester, oligo-phosphoric acid ester, phosphonic acid ester, phosphonate amine and phosphazenes.

8. The composition according to claim 1 wherein the phosphorus-containing flameproofing agent is compound conforming to formula (IV)

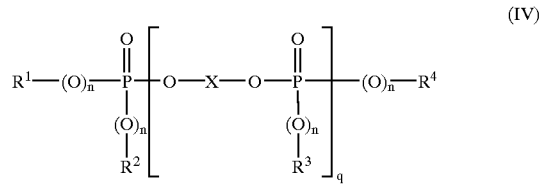

(IV)

wherein $R^1$, $R^2$, $R^3$ and $R^4$ independently one of the others denote $C_1$- to $C_8$-alkyl, or $C_5$- to $C_6$-cycloalkyl, $C_6$- to $C_{20}$-aryl or $C_7$- to $C_{12}$-aralkyl each optionally substituted by alkyl and/or by halogen, n independently one of the others denotes 0 or 1, q is 0 to 30, and X is a mono- or poly-nuclear aromatic radical having from 6 to 30 carbon atoms, or a linear or branched aliphatic radical having from 2 to 30 carbon atoms which may be OH-substituted and contain up to 8 ether bonds.

9. The composition of claim 8 wherein $R^1$, $R^2$, $R^3$ and $R^4$ independently one of the others are halogenated.

10. The composition of claim 8 wherein X is OH-substituted.

11. The composition of claim 8 wherein X contains up to 8 ether bonds.

12. The composition of claim 1 wherein the phosphorus-containing flameproofing agent is a compound conforming to formula (IVa)

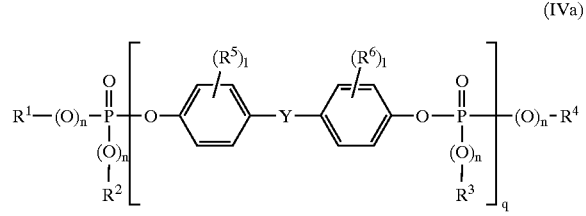

(IVa)

wherein $R^1$, $R^2$, $R^3$ and $R^4$ independently one of the others denote $C_1$- to $C_8$-alkyl, or $C_5$- to $C_6$-cycloalkyl, $C_6$- to $C_{10}$-aryl or $C_7$- to $C_{12}$-aralkyl, n independently one of the others denote 0 or 1, I independently one of the other denote 0, 1, 2, 3 or 4, q is 0.3 to 20, $R^5$ and $R^6$ are each independently of the other $C_1$–$C_4$-alkyl, and Y represents $C_1$–$C_7$-alkylidene, $C_1$–$C_7$-alkylene, $C_5$–$C_{12}$-cycloalkylene, $C_5$–$C_{12}$-cycloalkylidene, —O—, —S—, —SO—, $SO_2$ or —CO—.

13. The composition of claim 12 wherein $R^1$, $R^2$, $R^3$ and $R^4$ independently one of the others is alkyl-substituted.

14. The composition according to claim 1 wherein the phosphorus-containing flameproofing agent is a compound conforming to

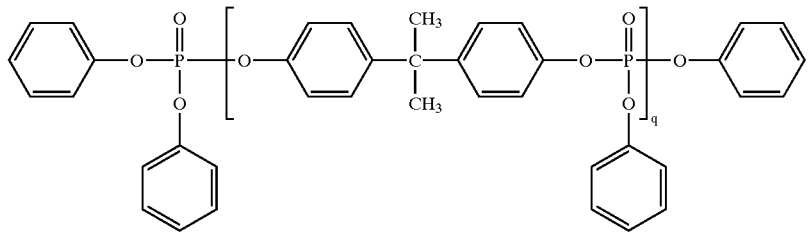

wherein q is 0.3 to 10.

15. The composition according to claim 1 further containing at least one member selected from the group consisting of vinyl (co)polymer and polyalkylene terephthalate.

16. The composition according to claim 1 further containing a positive amount up to 30 wt. %, based on the total composition, of a vinyl (co)polymer.

17. The composition according to claim 1 further containing at least one member selected from the group consisting of anti-dripping agent, lubricant, mold-release agent, nucleating agent, antistatic, stabilizer, coloring agent, pigment, filler and reinforcing agent.

18. The composition according to claim 1 further containing a fluorinated polyolefin.

19. A thermoplastic molding composition comprising polycarbonate in an amount of 50 to 90%, an impact modifier in an amount of 1.5 to 25% selected from the group consisting of emulsion polymerized ABS and mass polymerized ABS, a phosphorus-containing flameproofing agent in an amount of 2 to 20% conforming to formula (IVa)

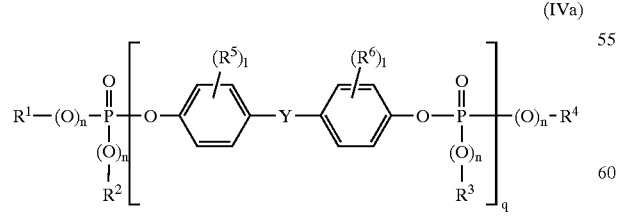

wherein
$R^1$, $R^2$, $R^3$ and $R^4$ independently one of the others denote $C_1$–$C_8$-alkyl, $C_5$–$C_6$-cycloalkyl, $C_6$–$C_{10}$-aryl or $C_7$–$C_{12}$-aralkyl, n independently one of the others denote 0 or 1, I independently one of the other denote 0,1,2, 3 or 4, q is 0.3 to 20, $R^5$ and $R^6$ independently one of the other denote $C_1$–$C_4$-alkyl, and Y represents $C_1$–$C_7$-alkylidene, $C_1$–$C_7$-alkylene, $C_5$–$C_{12}$-cycloalkylene, $C_5$–$C_{12}$-cycloalkylidene, —O—, —S—, —SO—, —SO$_2$ or —CO—, and, 0 to 20 wt. % of a vinyl (co)polymer, and 1 to 20 wt. % talc the talc having MgO content of 30.5 to 32 wt. %, SiO$_2$ content of 60 to 62.5 wt. % and Al$_2$O$_3$ content lower than 0.7 wt. %, the wt. %, all occurrences being relative to the weight of the talc, and the talc having $d_{50}$ less than or equal to 2.5 μm, the % all occurrences being relative to the weight of the composition.

20. A thermoplastic molding composition comprising polycarbonate in an amount of 50 to 90%, an impact modifier in an amount of 1.5 to 25% selected from the group consisting of emulsion polymerized ABS and mass polymerized ABS, a phosphorus-containing flameproofing agent in an amount of 2 to 20% conforming to formula

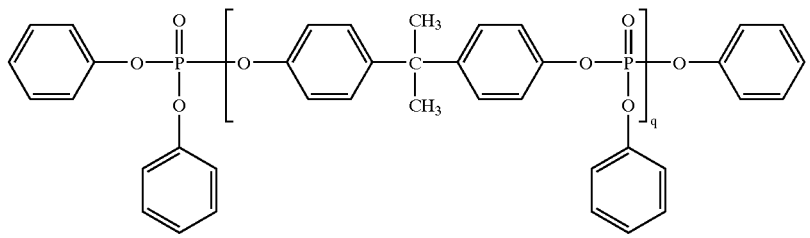

wherein q is 0.3 to 10
and 0 to 20 wt. % of a vinyl (co)polymer, and 1 to 20 wt. % talc the talc having MgO content of 30.5 to 32 wt. %, SiO$_2$ content of 60 to 62.5 wt. % and Al$_2$O$_3$ content lower than 0.7 wt. %, the wt. %, all occurrences being relative to the weight of the talc, and the talc having $d_{50}$ less than or equal to 2.5 μm, the % all occurrences being relative to the weight of the composition.

21. A method of using the composition of claim 1 comprising producing a molded article.

22. A molded article comprising the composition of claim 1.

* * * * *